United States Patent Office 3,776,857
Patented Dec. 4, 1973

3,776,857
WATER-IN-OIL EMULSIONS
Paul Lindner, Evanston, Ill., assignor to Witco Chemical Company, New York, N.Y.
No Drawing. Continuation of abandoned application Ser. No. 839,667, July 7, 1969. This application Sept. 24, 1971, Ser. No. 183,646
Int. Cl. B01j 13/00
U.S. Cl. 252—308                    9 Claims

ABSTRACT OF THE DISCLOSURE

Stable (invert) water-in-oil emulsions are readily prepared comprising an oleaginous continuous phase, a dispersed water phase, and, as the emulsifier, fatty acid esters of ethylene oxide adducts of aliphatic polyhydric alcohols, said alcohols containing from 3 to 12 carbon atoms and 3 to 6 hydroxyl groups and said adducts containing from about 0.3 to about 1.5 mols of ethylene oxide per hydroxyl group.

---

This is a continuation of application Ser. No. 839,667, filed July 7, 1969, now abandoned.

The present invention relates to novel water-in-oil emulsions. More particularly, this invention relates to invert emulsions of the water-in-oil type which are formed very quickly and, in many cases, instantaneously or almost instantaneously, and exhibit excellent stability through the utilization of certain ethoxylated polyol fatty acid ester emulsifiers.

Water-in-oil emulsions, that is, emulsions of the type wherein the continuous phase is a normally hydrophobic phase such as oil and the dispersed phase is water or aqueous material, have long been used as drilling fluids, fracturing fluids, hydraulic fluids, cutting oils, lubricants and the like, as well as in cosmetic emulsions and miscellaneous detergent compositions. It is known in the art that certain difficulties are encountered in preparing stable, water-in-oil emulsions. Commonly, high speed propeller or turbine stirrers, homogenizers, colloid mills and similar equipment are required in order to effectively prepare emulsions of stable character. The prior art describes many types of emulsifying agents which have been combined with various proportions of water and oil to promote the formation of emulsions.

It is a significant feature of the present invention that stable, invert emulsions containing substantial portions of water can be prepared simply and rapidly and without the need for high speed mixing or the careful and slow addition of one phase to another. The emulsions of the present invention may easily be prepared by combining the total quantity of oleaginous component, water component and emulsifier and simply mixing the components at room temperature. Any order of addition of components usually may be employed generally with little or no effect upon the stability of the emulsion.

It has been discovered, in accordance with the present invention, that stable, water-in-oil emulsions can rapidly be prepared through the utilization of certain special ester emulsifying agents. Such emulsifying agents must satisfy certain requirements in order to achieve the particular advantages of the present invention. Briefly stated, said emulsifying agents are long chain aliphatic monocarboxylic, particularly long chain fatty, acid partial esters of ethylene oxide adducts of aliphatic polyhydric alcohols (or polyols), said aliphatic polyhydric alcohols having from 3 to 12 carbon atoms and from 3 to 6 hydroxyl groups, said ethylene oxide adducts containing from about 0.3 to about 1.5 mols of ethylene oxide per hydroxyl group in the aliphatic polyhydric alcohol. The long chain aliphatic monocarboxylic, particularly fatty, acid esters are generally very predominately mono-esters although there are also usually present minor amounts of di-esters.

Various aliphatic polyhydric alcohols or polyols, or mixtures of same, may be employed as starting materials in preparing the emulsifying agents suitable for use in the novel invert water-in-oil emulsions of the present invention. Among such polyhydric alcohols containing from 3 to 12 carbon atoms and from 3 to 6 hydroxyl groups are, for instance, glycerol, trimethylolpropane, triethylolpropane, trimethylolethane, triethanolamine, hexanetriols, pentaerythritol, dipentaerythritol, polyglycerols such as diglycerol, triglycerol, tetraglycerol and higher polyglycerols, sugars and sugar alcohols such as dextrose, sucrose, sorbitol, mannitol and arabitol, and mixtures of any two or more thereof in varying proportions.

The ethylene oxide content of the adducts suitable for use in accordance with the practice of the present invention will vary somewhat, depending upon the number of hydroxyl groups present in the polyhydric alcohol utilized, but in all cases there will be present from about 0.3 to no more than about 1.5, and particularly advantageously from 0.5 to 1.0 mols of ethylene oxide, per hydroxyl group. Maintenance of this controlled low degree of ethoxylation is essential for the preparation of the invert water-in-oil emulsions of the present invention. Conventional techniques of adducting aliphatic polyhydric alcohols with ethylene oxide may be used.

The long chain or higher molecular weight aliphatic monocarboxylic, and particularly fatty, acids which are esterified with the ethoxylated polyhydric alcohols or polyols to form the emulsifying agents used in preparing the novel water-in-oil emulsions of the present invention generally comprise those which contain from 12 to 22 carbon atoms, including both saturated and unsaturated fatty acids derived synthetically or from natural sources. Of especially utility are fatty acids containing from 16 to 18 carbon atoms and particularly the $C_{16}$–$C_{18}$ liquid unsaturated fatty acids. Specific examples of suitable fatty acids include lauric acid, myristic acid, palmitic acid, stearic acid, oleic acid, linoleic acid, tall oil fatty acids, ricinoleic acid, hydroxystearic acid, mixed higher fatty acids, acids derived from animal or vegetable sources such as lard, coconut oil, cottonseed oil, fish or marine oils, and the like, as well as higher molecular weight straight and branched chain aliphatic monocarboxylic acids derived by oxidation and other methods from petroleum.

The emulsifying agents used in accordance with the present invention may be mono- or di-ester of the ethoxylated polyhydric alcohol. However, for best results it has been found advantageous to utilize a mono-ester or a mixture of mono- and di-esters with the mono-ester predominating. Conventional esterification techniques well known in the art can be used, no special methods being necessary to produce the invert emulsifying agents of this invention.

The emulsifying agents utilized in accordance with the present invention are most desirably made by initially adducting the aliphatic polyhydric alcohols with the specified limited amount of ethylene oxide, and then esterifying said adducts with the long chain aliphatic monocarboxylic or fatty acids. This is particularly the case, for instance, where the aliphatic polyhydric alcohol is sorbitol or mannitol. Alternatively, one may start with a long chain aliphatic monocarboxylic or fatty acid ester of the aliphatic polyhydric alcohol, for instance, an oleic acid or tall oil fatty acid mono-ester (or predominately mono-ester with lesser proportions of di-ester) of glycerol, and then adduct the same with the specified quantity of ethylene oxide. It is important, for the purposes of the present invention, that ring formation or destruction of hydroxyl groups of the original aliphatic polyhydric alcohol do not occur so as to form, for instance, anhydrohexitols, and that the hydroxyl groups of the original aliphatic polyhydric alcohol be utilized for reaction solely with the ethylene oxide or the long chain aliphatic monocarboxylic acid or, to some extent, remain free, all within the scope and limits of the reactions which occur using the specified relative proportions of reactants. Where hexitols, such as sorbitol or mannitol, are employed, partial esterification of the hydroxyl groups thereof, for instance, one or two of the hydroxyl groups, can initially be effectuated with a long chain aliphatic monocarboxylic acid acyl halide, such as lauroyl chloride or oleoyl chloride, in the presence of an amine, for example, pyridine, after which the resulting partial ester can be reacted with the specified limited proportion of ethylene oxide. However, as stated above, it is especially advantageous initially to carry out the adduction and then follow with the esterification.

Long chain fatty acid esters of ethylene oxide adducts of aliphatic polyhydric alcohols have long been known as surfactants for a variety of uses and a summary thereof and methods for their production are described in "Nonionic Surfactants," edited by M. J. Schick (N.Y., Marcel Dekker, Inc., 1967) at pp. 270–272. Generally, such surfactants utilize a large number of moles of ethylene oxide per hydroxyl group of the aliphatic polyhydric alcohol, and they are generally ineffective to achieve the results obtained in accordance with the present invention in the rapid production of stable, invert water-in-oil emulsions.

The continuous phase of the water-in-oil emulsions of the present invention comprises a broad range of oleaginous materials which are normally insoluble or essentially insoluble in water such as mineral oils and white mineral oils of low to moderate viscosity; petroleum hydrocarbons such as Nos. 1 and 2 distillate fuel oils, naphtha, kerosene, gasoline, diesel oils and similar petroleum fractions; petroleum aliphatic solvents such as Varsol; chlorinated solvents such as tetrachloroethylene and 1,1,1-trichloroethane and mixed halogenated organic solvents such as trichlorofluoroethane and dichlorofluoromethane; straight and branched chain normally liquid aliphatic hydrocarbons such as pentane, hexane, heptane, octane, isooctane, nonane, decane, dodecane, cetane, isohexane and 3-methylpentane; unsaturated aliphatic compounds such as 2-ethyl-1-butene, pentenes, dodecene, methylpentadienes, 2-methyl-1-pentene and the like; animal oils and vegetable oils such as lard oil, fish oils, corn oil, soya bean oil, cottonseed oil, peanut oil, safflower oil and coconut oil; aromatic and alkylaromatic hydrocarbons such as benzene, toluene, cumene and cymene; and cycloaliphatic materials such as cyclohexane and cyclopentane. Generally speaking, in those instances where the oleaginous phase is a normally liquid petroleum hydrocarbon, it is preferred that the same have a viscosity not substantially in excess of about 1000 S.U.S. at 210 F.

The relative proportions of the dispersed aqueous phase and the continuous oleaginous phase in the water-in-oil emulsions of the present invention are quite variable. In certain cases, invert emulsions of the present invention may be prepared with 25 to 30 volumes and even more volumes of water per volume of oleaginous phase with reasonably satisfactory stabilities, but stable emulsions containing about 1 to 10 volumes of water per volume of oleaginous phase are particularly advantageously employed.

The proportions of emulsifying agent utilized will be from about 3% to about 20% by weight of the oleaginous component and preferably in the range of from about 8% to 12%. It is preferable to first combine the emulsifying agent with the oleaginous component and then simply admix the water therewith whereupon the invert emulsion is formed quickly. It is a special feature of the present invention that very large quantities of emulsion may be very rapidly formed since the aqueous component may be added very quickly to the oleaginous component, thus offering distinct economic benefits in commercial scale preparations.

Various supplemental materials may be incorporated into the emulsions of the present invention provided, of course, that the material added is compatible with the emulsion and has no adverse effect upon its stability. Among the materials that may be added are, by way of illustration, organic solvents, fatty alcohols, bactericides, bacteriostats, colors, perfumes and the like; and organic solvent-soluble herbicides and other pesticides such as substituted phenoxy herbicides, chlordane, aldrin, dieldrin, lindane, heptachlor, nemagon, toxaphene, organic thiocyanates and the like.

The invention is further illustrated by the following examples which are not to be considered as limitative of its scope. All parts listed are by weight.

EXAMPLE 1

To 90 parts of tetrachloroethylene in a glass vessel was added 10 parts of an emulsifying agent prepared by adducting 6 moles of ethylene oxide with one mole of sorbitol and esterifying same with 1.8 moles of oleic acid. To this was added 300 parts of tap water. The vessel was shaken by hand for about 2 minutes and immediately a uniform water-in-oil emulsion was formed.

EXAMPLE 2

9 parts of kerosene were combined with 1 part of esterified ethoxylated glycerol (1.7 moles ethylene oxide and 1.3 moles of oleic acid per mole of glycerol). To this was added 70 parts of 300 p.p.m. hardness water and with a few single shakes the system became a stable water-in-oil emulsion.

EXAMPLE 3

Example 2 was repeated substituting light mineral oil for kerosene and again a stable invert emulsion was formed.

EXAMPLE 4

A viscous invert emulsion was prepared by combining 9 parts light mineral oil, 3 parts isopropanol, 1 part of the emulsifying agent of Example 2 and 70 parts water of 300 p.p.m. hardness. These types of invert emulsions are especially useful in cosmetic formulations.

EXAMPLE 5

To 20 parts of a concentrate of 2 pounds acid equivalent per gallon of 2-ethylhexyl-2,4-dichlorophenoxy acetic acid ester containing 38.6% of said ester (acid equivalent 65.1%), 51.4% kerosene, and 10% of a 30/70 blend of glycerol-pentaerythritol ethoxylated with 2.9 moles of ethylene oxide and then esterified with 1.1 moles of oleic acid per average mole of said ethoxylated blend, there was added 60 parts of water of 292 p.p.m. hardness, with moderate stirring, to form a stable water-in-oil emulsion.

EXAMPLE 6

An emulsion useful for agricultural purposes was prepared by combining 18 parts of a 45% by weight solution of aldrin in heavy aromatic naphtha with 2 parts of the ethoxylated sorbitol ester emulsifying agent used in Example 1 and adding very rapidly with moderate stirring 40 parts of tap water whereby a thick and stable water-in-oil emulsion was immediately formed.

What is claimed is:

1. A method for preparing a stable water-in-oil emulsion which comprises combining together, under conditions of simple admixture, an aqueous component, an oleaginous component and an emulsifying agent being a $C_{12}$ to $C_{22}$ aliphatic monocarboxylic acid mono- and/or di-ester of an ethylene oxide adduct of an aliphatic polyhydric alcohol, said alcohol having from 3 to 12 carbon atoms and 3 to 6 hydroxyl groups and said adduct containing from 0.3 to about 1.5 moles of ethylene oxide per hydroxyl group.

2. A method according to claim 1 wherein there is present from about 3% to about 20% by weight of said emulsifying agent based on the weight of the oleaginous component.

3. A method for preparing a water-in-oil emulsion which comprises combining together an aqueous component, an oleaginous component and an emulsifying agent being a $C_{12}$ to $C_{22}$ aliphatic monocarboxylic acid mono- and/or di-ester or an ethylene oxide addict of an aliphatic polyhydric alcohol, said alcohol having from 3 to 12 carbon atoms and 3 to 6 hydroxyl groups and said adduct containing from 0.3 to about 1.5 moles of ethylene oxide per hydroxyl group, said aqueous component being present in from about 1 to 10 units per unit volume of said oleaginous component, said aqueous component, said oleaginous component and said emulsifying agent being capable of forming a stable water-in-oil emulsion without vigorous agitation.

4. A method according to claim 1 wherein said adduct contains from about 0.5 to about 1 mol of ethylene oxide per hydroxyl group.

5. A method according to claim 1 wherein the polyhydric alcohol is a member selected from the group consisting of glycerol, sorbitol, mannitol and pentaerythritol.

6. A method according to claim 1 wherein said $C_{12}$ to $C_{22}$ monocarboxylic acid is a member of the group consisting of oleic acid and tall oil fatty acid.

7. A method according to claim 1 wherein the oleaginous component is a liquid petroleum hydrocarbon.

8. A method according to claim 7 wherein the oleaginous component contains at least one pesticide selected from the group consisting of substituted phenoxy herbicides, chlordane, aldrin, dieldrin, lindane, heptachlor, nemagon, toxaphene and organic thiocyanates.

9. A method according to claim 1 which comprises first admixing said emulsifying agent with said oleaginous component and then adding the aqueous component to said admixture.

References Cited

Bennett's Practical Emulsions, Chemical Pub. Co., Brookyln, N.Y. (1943), pp. 14–17, 37 and 38.

JOHN D. WELSH, Primary Examiner

U.S. Cl. X.R.

424—172; 252—356; 424—168